(12) United States Patent
Kamakura et al.

(10) Patent No.: US 10,458,506 B2
(45) Date of Patent: Oct. 29, 2019

(54) SOLENOID VALVE

(71) Applicant: KAYABA INDUSTRY CO., LTD., Tokyo (JP)

(72) Inventors: Ryosuke Kamakura, Aichi (JP); Satoshi Chikamatsu, Gifu (JP); Shinichi Hagidaira, Gifu (JP); Yasuhiro Inagaki, Aichi (JP); Yoshifumi Kobayashi, Aichi (JP); Toshihiro Mori, Aichi (JP); Tomoyasu Abe, Aichi (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 14/768,197

(22) PCT Filed: Feb. 5, 2014

(86) PCT No.: PCT/JP2014/052668
§ 371 (c)(1),
(2) Date: Aug. 14, 2015

(87) PCT Pub. No.: WO2014/125974
PCT Pub. Date: Aug. 21, 2014

(65) Prior Publication Data
US 2016/0025176 A1 Jan. 28, 2016

(30) Foreign Application Priority Data

Feb. 15, 2013 (JP) .................. 2013-027393

(51) Int. Cl.
*F16F 9/34* (2006.01)
*F16F 9/50* (2006.01)
(Continued)

(52) U.S. Cl.
CPC ............. *F16F 9/34* (2013.01); *F16F 9/465* (2013.01); *F16F 9/50* (2013.01); *F16K 31/0693* (2013.01); *F16K 31/42* (2013.01)

(58) Field of Classification Search
CPC ............. F16K 31/0665; F16K 31/0668; F16K 31/0693; F16K 31/0696; F16K 31/42;
(Continued)

(56) References Cited

U.S. PATENT DOCUMENTS 2,573,369 A * 10/1951 Snoddy ................. F16K 31/402
251/30.05
3,799,496 A * 3/1974 Esten .................... F16K 31/402
137/98
(Continued)

FOREIGN PATENT DOCUMENTS

| EP | 2 103 835 A1 | 9/2009 |
|---|---|---|
| JP | S62-147181 A | 7/1987 |

(Continued)

*Primary Examiner* — Mary E McManmon
*Assistant Examiner* — Richard K. Durden
(74) *Attorney, Agent, or Firm* — Rabin & Berdo, P.C.

(57) ABSTRACT

A solenoid valve includes a valve seat provided in a main flow passage, a main valve body configured to open or close the main flow passage, a pilot passage that branches from the main flow passage, an orifice provided in the pilot passage, a back-pressure chamber connected to the pilot passage downstream from the orifice to bias the main valve body to a closing direction by virtue of an internal pressure, a pilot valve disposed in the pilot passage downstream from a connection point to the back-pressure chamber to control an internal pressure of the back-pressure chamber, a solenoid configured to control a valve opening pressure of the pilot valve, and a second orifice provided between the back-pressure chamber and the pilot valve.

4 Claims, 4 Drawing Sheets

(51) Int. Cl.
*F16K 31/42* (2006.01)
*F16K 31/06* (2006.01)
*F16F 9/46* (2006.01)

(58) Field of Classification Search
CPC ...... F16K 47/026; F16K 9/3405; F16K 9/341;
F16K 9/346; F16K 9/348; F16K 9/3488;
F16K 9/46; F16K 9/464; F16K 9/465;
F16K 9/50; F16F 9/3405; F16F 9/341;
F16F 9/346; F16F 9/348; F16F 9/3488;
F16F 9/46; F16F 9/464; F16F 9/465;
F16F 9/50
USPC ....... 188/266.1, 266.2, 266.5, 266.6, 322.13,
188/322.15; 251/50, 282, 318, 30.02
See application file for complete search history.

(56) References Cited

U.S. PATENT DOCUMENTS

| | | | | |
|---|---|---|---|---|
| 4,802,561 | A * | 2/1989 | Knecht | F16F 9/465 |
| | | | | 188/266.6 |
| 5,098,263 | A * | 3/1992 | Hattori | F16L 55/053 |
| | | | | 417/294 |
| 5,282,645 | A * | 2/1994 | Spakowski | F16F 9/46 |
| | | | | 137/854 |
| 5,316,113 | A | 5/1994 | Yamaoka | |
| 5,934,421 | A * | 8/1999 | Nakadate | F16F 9/325 |
| | | | | 188/299.1 |
| 6,155,391 | A * | 12/2000 | Kashiwagi | F16F 9/348 |
| | | | | 188/266.6 |
| 6,182,805 | B1 | 2/2001 | Kashiwagi et al. | |
| 6,332,622 | B1 * | 12/2001 | Nakamura | B60G 17/033 |
| | | | | 188/266.5 |
| 6,729,446 | B2 * | 5/2004 | Sakai | F16F 9/463 |
| | | | | 188/266.2 |
| 2009/0065315 | A1 * | 3/2009 | Chikamatsu | F16F 9/5126 |
| | | | | 188/313 |
| 2009/0242339 | A1 * | 10/2009 | Nakadate | F16F 9/464 |
| | | | | 188/266.5 |
| 2011/0024247 | A1 * | 2/2011 | Chikamatsu | F16F 9/348 |
| | | | | 188/322.15 |
| 2011/0073424 | A1 * | 3/2011 | Murakami | F16F 9/465 |
| | | | | 188/322.13 |
| 2011/0290603 | A1 | 12/2011 | Yabe | |

FOREIGN PATENT DOCUMENTS

| | | |
|---|---|---|
| JP | S64-48498 U | 3/1989 |
| JP | H01-135936 A | 5/1989 |
| JP | H03-168431 A | 7/1991 |
| JP | H07-016044 U | 3/1995 |
| JP | H10-259801 A | 9/1998 |
| JP | 2001-041271 A | 2/2001 |
| JP | 2004-232764 A | 8/2004 |
| JP | 2004-239344 A | 8/2004 |
| JP | 2009-222136 A | 10/2009 |
| JP | 2011-247371 A | 12/2011 |

* cited by examiner

SOLENOID VALVE

TECHNICAL FIELD

This invention relates to a solenoid valve.

BACKGROUND ART

It is known that a solenoid valve is used as a controllable damping valve capable of controlling a damping force of a shock absorber interposed between a chassis and an axle of a vehicle. In JP 2009-222136 A, there is discussed such a solenoid valve. The solenoid valve includes an annular valve seat provided in a main flow passage connected from a cylinder of the shock absorber to a reservoir, a main valve body seated on or unseated from the annular valve seat to open or close the main flow passage, a pilot passage branching from the main flow passage, an orifice provided in the pilot passage, a back-pressure chamber provided in a rear face side of the main valve body opposite to the valve seat side, a pilot valve provided in a downstream of the pilot passage, and a solenoid configured to control a valve opening pressure of the pilot valve.

A secondary pressure downstream from the orifice in the pilot passage is introduced into the back-pressure chamber, and the main valve body is pressed by the secondary pressure. Since the pilot valve is provided downstream from the back-pressure chamber, the secondary pressure introduced into the back-pressure chamber is controlled by the valve opening pressure of the pilot valve by adjusting the valve opening pressure of the pilot valve using a thrust force of the solenoid.

The secondary pressure is applied to the rear face of the main valve body to exert a force such that the main valve body is pressed toward the valve seat side. A pressure is applied from the upstream of the main flow passage to the front face of the main valve body to exert a force such that the main valve body is flexed and is unseated from the valve seat. Therefore, the main valve body is opened when the force of unseating the main valve body from the valve seat by virtue of the pressure from the upstream side of the main flow passage exceeds the force of pressing the main valve body to the valve seat by virtue of the secondary pressure.

That is, it is possible to adjust the valve opening pressure of the main valve body by controlling the secondary pressure. Therefore, the solenoid valve can change resistance to the liquid flow passing through the main flow passage by adjusting the valve opening pressure of the pilot valve using the solenoid so that a desired damping force can be generated in the shock absorber.

SUMMARY OF INVENTION

The solenoid valve of the prior art described above is provided with a spring for biasing the pilot valve to open the pilot passage. The solenoid exerts a thrust force for closing the pilot passage toward the pilot valve. That is, the valve opening pressure of the pilot valve is adjusted by changing the electric current amount applied to the solenoid.

As the pilot valve is opened, the solenoid valve releases the pressure of the upstream side of the pilot passage to the reservoir. As a result, the back-pressure chamber is controlled by the valve opening pressure of the pilot valve. However, since a delay occurs when the pilot valve is opened from the closed state, the internal pressure of the back-pressure chamber rises over the valve opening pressure of the pilot valve only for an instant. Then, as the pilot valve is opened, and the pressure is released, the pressure of the back-pressure chamber decreases to the valve opening pressure.

In this manner, since the opening level of the main flow passage of the main valve body abruptly changes due to an abrupt change of the internal pressure of the back-pressure chamber at the time of opening the pilot valve, the damping force generated by the shock absorber also abruptly changes. As a result, vibration of a chassis or abnormal noise in a cabin may be generated.

In view of the aforementioned problems, it is therefore an object of this invention to provide a solenoid valve capable of alleviating an abrupt change of the damping force.

According to one aspect of the present invention, a solenoid valve includes a valve seat provided in a main flow passage, a main valve body seated on or unseated from the valve seat to open or close the main flow passage, a pilot passage that branches from the main flow passage, an orifice provided in the pilot passage, a back-pressure chamber connected to the pilot passage downstream from the orifice, the back-pressure chamber being configured to bias the main valve body to a closing direction by virtue of an internal pressure, a pilot valve disposed in the pilot passage downstream from a connection point to the back-pressure chamber, the pilot valve being configured to control an internal pressure of the back-pressure chamber, a solenoid configured to control a valve opening pressure of the pilot valve, and a second orifice provided between the back-pressure chamber and the pilot valve.

DESCRIPTION OF EMBODIMENTS

A description will now be made for embodiments of this invention with reference to the accompanying drawings.

First, a first embodiment will be described.

Figure 1:
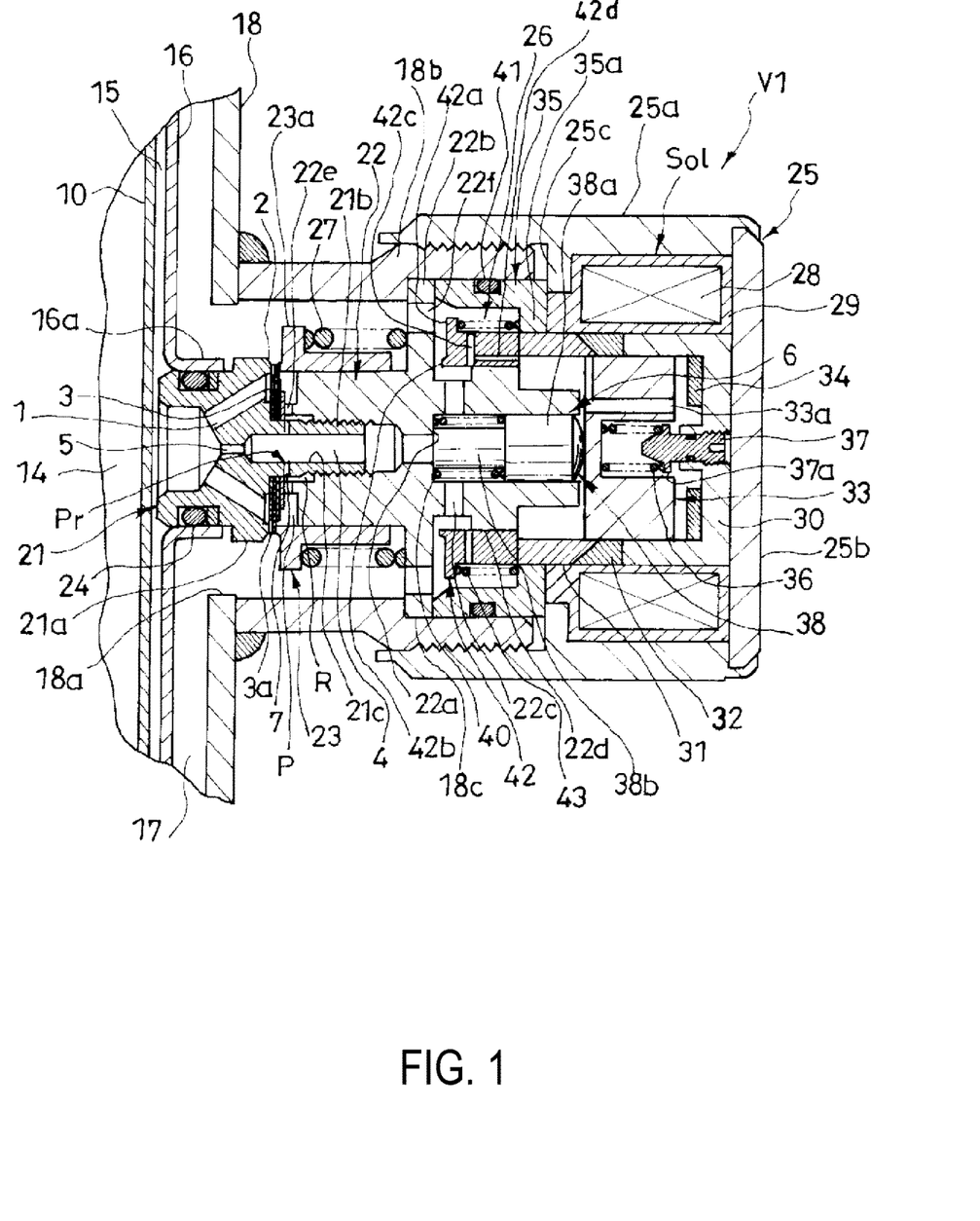
FIG. 1 is a cross-sectional view illustrating a solenoid valve according to a first embodiment of this invention.

FIG. 1 is a cross-sectional view illustrating a solenoid valve V1 according to this embodiment. The solenoid valve V1 includes a valve seat 2 provided in the main flow passage 1, an annular leaf valve 3 seated on or unseated from the valve seat 2 to serve as a main valve body for opening or closing the main flow passage 1, a pilot passage 4 branching from the main flow passage 1, an orifice 5 provided in the pilot passage 4, a back-pressure chamber P connected to the pilot passage 4 downstream from the orifice 5 to bias the leaf valve 3 to a closing direction using an internal pressure, a pilot valve 6 disposed in the pilot passage 4 downstream from a connection point to the back-pressure chamber P to control an internal pressure of the back-pressure chamber P, a solenoid Sol configured to adjust the valve opening pressure of the pilot valve 6, and a second orifice 7 provided between the back-pressure chamber P and the pilot valve 6.

Figure 2:
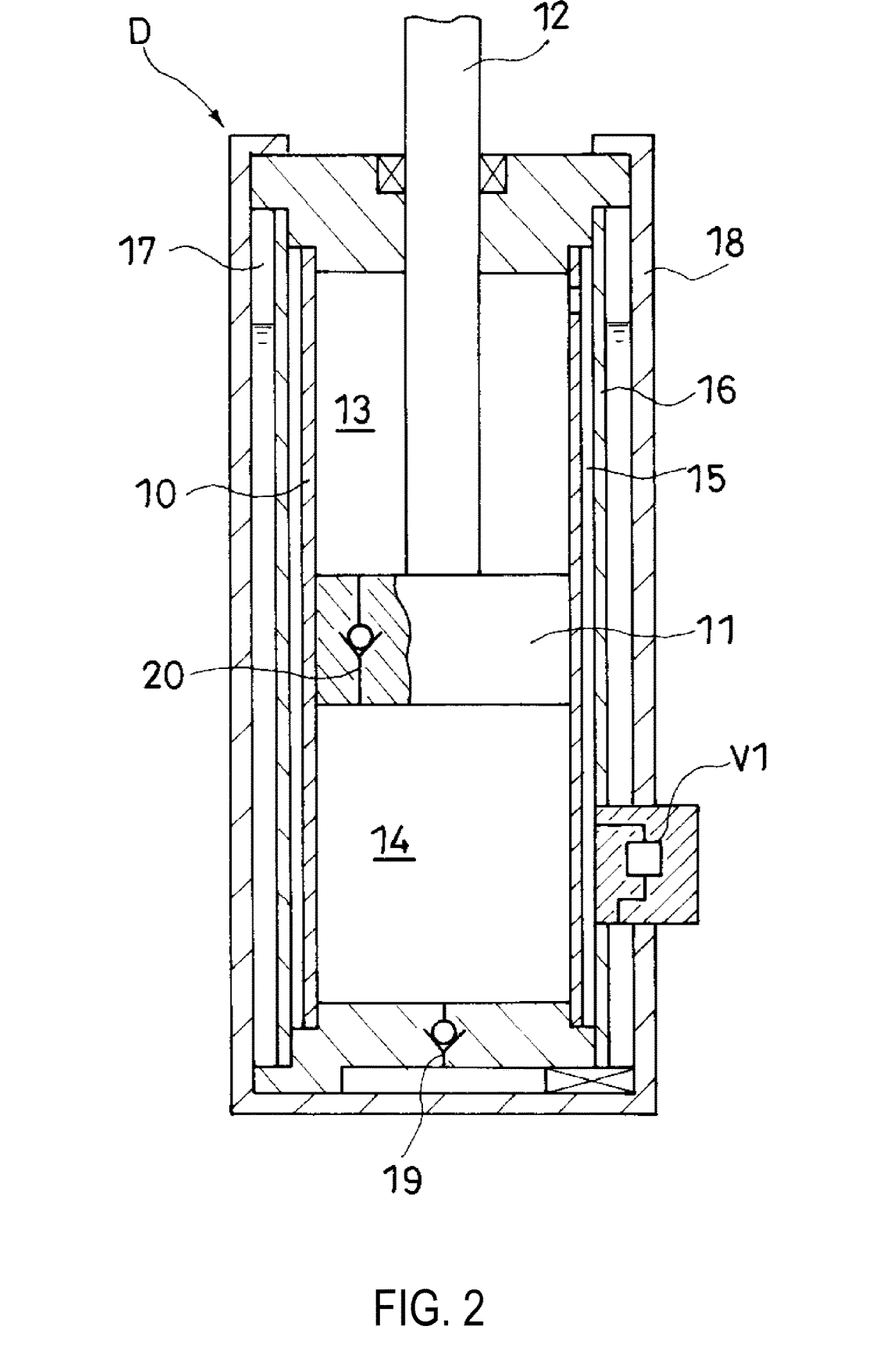
FIG. 2 is a cross-sectional view illustrating a shock absorber provided with the solenoid valve of FIG. 1.

FIG. 2 is a cross-sectional view illustrating a shock absorber D provided with the solenoid valve V1 of FIG. 1. The shock absorber D usually generates a damping force by applying resistance to a fluid passing through the main flow passage 1 in the event of expansion or contraction.

The shock absorber D includes a cylinder 10, a piston 11 slidably inserted into the cylinder 10, a rod 12 movably inserted into the cylinder 10 and connected to the piston 11, a rod-side chamber 13 and a piston-side chamber 14 partitioned by the piston 11 inside the cylinder 10, a pipe 16 that covers the outer circumference of the cylinder 10 to form a discharge passage 15 with the cylinder 10, and an outer tube 18 that covers the outer circumference of the pipe 16 to form a reservoir 17 with the pipe 16.

Hydraulic oil as a fluid is filled in the rod-side chamber 13, the piston-side chamber 14, and the reservoir 17 while the reservoir 17 is filled with gas in addition to the hydraulic oil. It is noted that the fluid may include any material other than the hydraulic oil if it can exert a damping force.

The shock absorber D further includes an inlet passage 19 that allows only for a flow of the hydraulic oil directed from the reservoir 17 to the piston-side chamber 14, and a piston passage 20 provided in the piston 11 to allow only for a flow of the hydraulic oil directed from the piston-side chamber 14 to the rod-side chamber 13. The discharge passage 15 causes the rod-side chamber 13 and the reservoir 17 to communicate with each other. The solenoid valve V1 is provided in the discharge passage 15 such that the main flow passage 1 is connected to the discharge passage 15 (FIG. 1).

When the shock absorber D is operated to contract, the piston 11 moves downward in FIG. 2 so that the piston-side chamber 14 is compressed, and the hydraulic oil of the piston-side chamber 14 moves to the rod-side chamber 13 via the piston passage 20. During the contraction, since the rod 12 intrudes into the cylinder 10, the amount of the hydraulic oil becomes excessive as much as the volume of the rod intruding into the cylinder 10. Therefore, the excessive hydraulic oil is extruded from the cylinder 10 and is discharged to the reservoir 17 via the discharge passage 15. Since the shock absorber D applies resistance to the flow of the hydraulic oil moving to the reservoir 17 via the discharge passage 15 by virtue of the solenoid valve V1, the internal pressure of the cylinder 10 increases, and a contractive damping force is exerted.

When the shock absorber D is operated to expand, the piston 11 moves upward in FIG. 2, so that the rod-side chamber 13 is compressed, and the hydraulic oil of the rod-side chamber 13 moves to the reservoir 17 via the discharge passage 15. During the expansion, the piston 11 moves upward, and the volume of the piston-side chamber 14 increases. Therefore, the hydraulic oil is supplied from the reservoir 17 via the inlet passage 19 as much as the volume increases. Since the shock absorber D applies resistance to the flow of the hydraulic oil moving to the reservoir 17 via the discharge passage 15 by virtue of the solenoid valve V1, the internal pressure of the rod-side chamber 13 increases, and an expansive damping force is exerted.

When the shock absorber D is operated to expand or contract, the hydraulic oil is necessarily discharged from the cylinder 10 to the reservoir 17 via the discharge passage 15. That is, the shock absorber D is a uni-flow type shock absorber in which the hydraulic oil is circulated in a unidirectional manner in the order of the piston-side chamber 14, the rod-side chamber 13, and the reservoir 17 and generates both expansive and contractive damping forces by virtue of a single solenoid valve V1.

It is noted that, if the cross-sectional area of the rod 12 is set to a half of the cross-sectional area of the piston 11, the amount of the hydraulic oil discharged from the cylinder 10 can be set to be the same between expansion and contraction with the same amplitude. Therefore, if the resistance to the flow caused by the solenoid valve V1 becomes constant, it is possible to set the expansive and contractive damping forces to the same value.

The solenoid valve V1 includes a seat member 21 that is fitted to a sleeve 16a provided in an opening of the pipe 16 and has a main flow passage 1, an annular valve seat 2, and an orifice 5, a leaf valve 3 mounted to an outer circumference of the seat member 21 and seated on or unseated from the valve seat 2 to serve as a main valve body, a valve housing 22 connected to the seat member 21 to form a cavity, a pilot valve 6 inserted into the valve housing 22 movably along an axial direction, a solenoid Sol that exerts a thrust force to the pilot valve body 38 in the pilot valve 6, and a main spool 23 that is slidably mounted to an outer circumference of the valve housing 22 and abuts on the rear face of the leaf valve 3 (the right face of FIG. 1) to define the back-pressure chamber P in the rear face side of the leaf valve 3. The pilot passage 4 is formed in the seat member 21 and the inside of the valve housing 22.

The seat member 21 includes a large-diameter basal portion 21a fitted to the sleeve 16a, a shaft portion 21b protruding to the right side of FIG. 1 from the basal portion 21a, a cavity 21c formed to penetrate through the basal portion 21a and the shaft portion 21b in an axial direction to form a part of the pilot passage 4, a second orifice 7 that is opened on the outer circumferential surface of the shaft portion 21b and communicates with the cavity 21c, an orifice 5 provided in the discharge passage 15 side upstream from the connection point of the second orifice 7 in the cavity 21c, a main flow passage 1 provided with a plurality of ports perforating through the basal portion 21a from the left end to the right end of FIG. 1, and an annular valve seat 2 provided in an exit of the main flow passage 1 which is the right end of the basal portion 21a in FIG. 1.

The main flow passage 1 penetrates through the basal portion 21a. The opening of the main flow passage 1 provided in the left end side of the basal portion 21a in FIG. 1 communicates with the rod-side chamber 13 via the discharge passage 15 formed with the pipe 16. The opening of the main flow passage 1 in the right end side of the basal portion 21a in FIG. 1 communicates with the reservoir 17. Similar to the main flow passage 1, the opening of the cavity 21c in the left end side of FIG. 1 communicates with the rod-side chamber 13 via the discharge passage 15.

It is noted that a seal ring 24 is mounted to an outer circumference of the basal portion 21a of the seat member 21. As a result, a gap between the outer circumference of the basal portion 21a and the inner circumference of the sleeve 16a is sealed, so that the discharge passage 15 is prevented from communicating with the reservoir 17 via the outer circumference of the basal portion 21a.

In the right end of the basal portion 21a of the seat member 21 in FIG. 1, the annular leaf valve 3 seated on or unseated from the valve seat 2 to open or close the main flow passage 1 is stacked. The inner circumference of the leaf valve 3 is interposed between the basal portion 21a and the valve housing 22 and is fixed to the outer circumference of the shaft portion 21b. Therefore, the outer circumference of the leaf valve 3 can be flexed as a free end. As the leaf valve 3 is flexed by receiving a pressure applied to the front face (the left face in FIG. 1) from the upstream of the main flow passage 1, the leaf valve 3 is unseated from the valve seat 2 to open the main flow passage 1. It is noted that the leaf valve 3 is a layered leaf valve obtained by stacking a plurality of annular sheets, and the number of the annular sheets may be arbitrarily set. In addition, a cutout orifice 3*a* is provided in the outer circumference of the annular sheet seated on the valve seat 2.

The valve housing 22 having a tubular shape has an annular pilot valve seat 22*a* formed as a small diameter portion provided in the center inner circumference. The valve housing 22 is connected to the seat member 21 by inserting and screwing the shaft portion 21*b* of the seat member 21 into the left side from the pilot valve seat 22*a* in FIG. 1. As a result, the inner circumference of the leaf valve 3 is interposed between the basal portion 21*a* of the seat member 21 and the left end of the valve housing 22 in FIG. 1. It is noted that the outer diameter of the valve housing 22 in the left end of FIG. 1 is formed to have a small diameter not to hinder the leaf valve 3 from being flexed.

The inner diameter of the left-end opening of the valve housing 22 in FIG. 1 is larger than the diameter of the portion where the shaft portion 21*b* is screwed. An annular gap R is formed between the seat member 21 and the valve housing 22 when the shaft portion 21*b* of the seat member 21 is inserted. In the left end of the valve housing 22 of FIG. 1, a cutout trench 22*e* extending in a radial direction is provided, so that the outer circumferential side of the valve housing 22 communicates with the annular gap R via the cutout trench 22*e* when the left end of the valve housing 22 abuts on the leaf valve 3. The annular gap R also communicates with the second orifice 7 formed in the shaft portion 21*b* of the seat member 21. It is noted that, although the cutout trench 22*e* is a trench formed in the left end of the valve housing 22 in FIG. 1, any other configuration such as a hole penetrating through the valve housing 22 may also be possible instead.

The valve housing 22 is provided with a flange 22*b* in the outer circumference. The flange 22*b* is fitted to the inner circumference of the tube 18*b* provided in the opening 18*a* formed in the lateral side of the outer tube 18 and abuts on the step portion 18*c* provided in the inner circumference of the tube 18*b*. It is noted that the tube 18*b* is provided with a thread portion in the outer circumference of the edge. A bottomed tubular casing 25 including the solenoid Sol is screwed to the tube 18*b*. As the casing 25 is screwed to the tube 18*b*, the flange 22*b* of the valve housing 22 is fixed to the tube 18*b*, and the seat member 21 screwed to the valve housing 22 is also fixed to a predetermined position of the tube 18*b*.

It is noted that a gap between the sleeve 16*a* and the seat member 21 is sealed by the seal ring 24 mounted in the outer circumference of the seat member 21, so that the basal portion 21*a* of the seat member 21 is inserted into the sleeve 16*a* with a margin. As a result, even when there is a deviation of the axial center between the tube 18*a* and the sleeve 16*a*, it is possible to easily fit the flange 22*b* of the valve housing 22 into the tube 18*b*.

The valve housing 22 has a through-hole 22*c* provided in a radial direction in the right side of FIG. 1 from the flange 22*b* and the pilot valve seat 22*a* to cause the inside and the outside to communicate with each other. The outer circumference of the valve housing 22 in the right side of FIG. 1 from the through-hole 22*c* is provided with a flange-like sliding contact portion 22*d* where a failsafe valve body 42 of a tubular failsafe valve 26 is slidably mounted. The flange 22*b* is provided with a through-hole 22*f* penetrating in the axial direction so that the space of the right side of FIG. 1 from the flange 22*b* communicates with the reservoir 17 of the left side.

The inside of the valve housing 22 communicates with the discharge passage 15 via the cavity 21*c* provided in the seat member 21 and with the rod-side chamber 13 via the discharge passage 15. The inside of the valve housing 22 communicates with the reservoir 17 via the through-holes 22*c* and 22*f*. That is, the valve housing 22 forms the pilot passage 4 branching from the main flow passage 1 and causing the rod-side chamber 13 and the reservoir 17 to communicate with each other in combination with the cavity 21*c* of the seat member 21.

A tubular main spool 23 having a brim 23*a* in its outer circumference is slidably mounted to the outer circumference of the valve housing 22 in the left side of FIG. 1 from the flange 22*b*. A spring 27 serving as a biasing mechanism is interposed between the brim 23*a* of the main spool 23 and the flange 22*b*. The spring 27 biases the main spool 23 toward the leaf valve 3 in the left side of FIG. 1 and causes the main spool 23 to abut on the right face of FIG. 1 (the rear face of the leaf valve 3). It is noted that the biasing mechanism may include various springs such as a coil spring or a disc spring or an elastic body such as rubber capable of exerting a resilient force against compression.

While the main spool 23 abuts on the rear face of the leaf valve 3, the back-pressure chamber P is defined in the rear face of the leaf valve 3 by virtue of the main spool 23. The back-pressure chamber P communicates with the cavity 21*c* of the pilot passage 4 via the cutout trench 22*e*, the annular gap R, and the second orifice 7 described above. The cutout trench 22*e*, the annular gap R, and the second orifice 7 constitute a communication passage Pr. The internal pressure of the pilot passage 4 propagates to the back-pressure chamber P via the communication passage Pr. Since the communication passage Pr is provided with the second orifice 7, even an abrupt pressure change occurring in the pilot passage 4 does not easily propagate to the back-pressure chamber P.

It is noted that the cutout trench 22*e* may also serve as the second orifice. In this case, the seat member 21 may be provided with a simple hole that causes the annular gap R and the cavity 21*c* to communicate with each other. In addition, the annular gap R is provided to cause the second orifice 7 and the cutout trench 22*e* to reliably communicate with each other even when the second orifice 7 and the cutout trench 22*e* do not face each other in the radial direction. However, the annular gap R may be omitted if the second orifice 7 and the cutout trench 22*e* face each other in the radial direction.

The internal pressure of the back-pressure chamber P is also applied to the rear face of the leaf valve 3 in addition to the biasing force for biasing the main spool 23 by the spring 27, so that the leaf valve 3 is biased toward the valve seat 2. That is, when the shock absorber D is operated to expand or contract, the internal pressure of the rod-side chamber 13 is applied to the leaf valve 3 from the front face side via the main flow passage 1, so that both the internal pressure of the back-pressure chamber P and the biasing force of the spring 27 are applied to the leaf valve 3 from the rear face side.

In this case, if the force of flexing the outer circumference of the leaf valve 3 toward the right side of FIG. 1 by virtue of the internal pressure of the rod-side chamber 13 exceeds a sum of flexural rigidity of the leaf valve 3, the force obtained by multiplying the internal pressure of the back-pressure chamber P by the pressure-receiving area of the leaf valve 3 for receiving the internal pressure, and the biasing force of the spring 27, the spring 27 is compressed, the main spool 23 retreats from the basal portion 21*a*, and the leaf valve 3 is flexed, so that the main flow passage 1 is opened.

The casing 25 includes a tubular portion 25a, a bottom portion 25b caulked to the opening end of the tubular portion 25a, and an annular stopper 25c fixed to the inner circumference side of the tubular portion 25a to hold a solenoid bobbin 29 where the coil 28 of the solenoid Sol is wound. The flange 22b of the valve housing 22 and a nonmagnetic spacer 35 are interposed using the stopper 25c and the step portion 18c of the tube 18b. As a result, the valve housing 22 and the seat member 21 are fixed to the shock absorber D. It is noted that, since the flange 22b is provided with a through-hole 22f, the pilot passage 4 and the reservoir 17 remain to communicate with each other.

The solenoid Sol includes a casing 25 having a bottomed tubular shape, an annular solenoid bobbin 29 fixed to the bottom of the casing 25, where coil 28 is wound, a first stator 30 that has a bottomed tubular shape and is fitted to the inner circumference of the solenoid bobbin 29, a second stator 31 that has a tubular shape and is fitted to the inner circumference of the solenoid bobbin 29, a nonmagnetic ring 32 fitted to the inner circumference of the solenoid bobbin 29 and interposed between the first and second stators 30 and 31, a rotor 33 that has a bottomed tubular shape and is disposed in the inner circumference side of the first stator 30, and a tubular failsafe valve 26 slidably mounted to the outer circumference of the sliding contact portion 22d of the valve housing 22 to serve as a rotor as well.

An opening end side of the rotor 33 having a bottomed tubular shape is slidably inserted into the inner circumference of the first stator 30 to face the inside of the first stator 30. The dimension of the rotor 33 is set such that the bottom side face in the left side of FIG. 1 faces or is arranged in the vicinity of the inner circumference of the second stator 31 even when it enters the inside of the first stator 30 until it abuts on a nonmagnetic washer 34 provided in the bottom of the first stator 30. The tube of the rotor 33 is provided with a communication hole 33a formed in an axial direction, and the spaces partitioned by the first stator 30 and the rotor 33 communicate with each other via the communication hole 33a.

A spring 36 is interposed between the rotor 33 and the first stator 30. The rotor 33 receives a thrust force from the spring 36 to retreat from the first stator 30. The spring 36 is supported by a spring bearing 37a provided in a leading end of a spring force adjustment screw 37 whose right end of FIG. 1 is screwed to the axial core of the first stator 30. The support position of the spring 36 may change across the left and right sides of FIG. 1 by advancing or retreating the spring force adjustment screw 37 against the first stator 30. It is noted that, according to this embodiment, manipulation of the spring force adjustment screw 37 is prohibited after the bottom portion 25b of the casing 25 is caulked to the opening end of the tubular portion 25a. However, by fixing the bottom portion 25b to the tubular portion 25a in a detachable manner, manipulation of the spring force adjustment screw 37 may be allowed even after the bottom portion 25b is fixed to the tubular portion 25a.

The second stator 31 has a tubular shape. The opening end of the second stator 31 in the first stator 30 side is formed in a tapered shape such that its diameter is reduced toward the first stator 30 side. As a result, a magnetic flux generated when the electric current flows to the coil 28 concentrates on the right-end inner circumference side of the second stator 31. The shape of the left end of FIG. 1 of the nonmagnetic ring 32 interposed between the first and second stators 30 and 31 matches the shape of the tapered end of the second stator 31.

In the solenoid Sol, a magnetic path is formed by the first and second stators 30 and 31, and the rotor 33. As the coil 28 is magnetically excited, the rotor 33 neighboring to the first stator 30 is attracted to the second stator 31 side, so that a thrust force is applied to the rotor 33 toward the left side of FIG. 1.

The bottom of the rotor 33 abuts on the pilot valve body 38 of the pilot valve 6 such that the thrust force of the spring 36 is transmitted to the pilot valve body 38. When the solenoid Sol is magnetically excited, a thrust force directed to the left side of FIG. 1 is applied to the pilot valve body 38 by virtue of the attracted rotor 33. It is noted that, if the washer 34 is formed of synthetic resin or the like, it is possible to suppress impact or noise when the rotor 33 collides.

The pilot valve body 38 includes a large-diameter portion 38a making sliding contact with the right-end inner circumference of the valve housing 22 in FIG. 1, and a cylindrical small-diameter portion 38b extending from the left end of the large-diameter portion 38a and facing the through-hole 22c of the valve housing 22. The pilot valve body 38 is a flat valve for opening or closing the pilot passage 4 by seating or unseating the left-end outer circumference of the small-diameter portion 38b of FIG. 1 on or from the pilot valve seat 22a provided in the inner circumference of the valve housing 22. Since the small-diameter portion 38b is spaced from the inner circumference of the valve housing 22, the pilot valve body 38 does not block the through-hole 22c.

A spring 40 is interposed between the left end of the large-diameter portion 38a of the pilot valve body 38 and the outer circumferential side of the pilot valve seat 22a of the valve housing 22. The spring 40 exerts a thrust force such that the pilot valve body 38 retreats from the pilot valve seat 22a so as to maximize the flow area of the pilot passage 4.

The pilot valve body 38 is inserted between the springs 36 and 40 by interposing the rotor 33. A thrust force is applied to the pilot valve body 38 from the spring 40 so as to maximize the flow area of the pilot passage 4. In addition, a thrust force is applied through the rotor 33 from the spring 36 so as to reduce the flow area of the pilot passage 4.

While no electric current flows to the coil 28 of the solenoid Sol, the thrust force of the spring 40 is equal to or stronger than that of the spring 36, and the rotor 33 is forcibly inserted into the first stator 30 until the rotor 33 abuts on the washer 34. As a result, the pilot valve body 38 retreats from the pilot valve seat 22a to the position where the flow area of the pilot passage 4 is maximized. While an electric current flows to the coil 28 of the solenoid Sol, the rotor 33 is attracted, so that the pilot valve body 38 is seated on the pilot valve seat 22a resisting to the biasing force of the spring 40. That is, by adjusting the electric current amount flowing to the solenoid Sol, it is possible to adjust the thrust force applied to the pilot valve body 38 and control the valve opening pressure of the pilot valve 6.

The pilot valve 6 includes a pilot valve seat 22a, a pilot valve body 38 seated on or unseated from the pilot valve seat 22a, and springs 36 and 40 that interpose the pilot valve body 38. The pilot valve 6 is provided downstream from a portion where the second orifice 7 and the cavity 21c intersect, which is the connection point where the back-pressure chamber P of the pilot passage 4 is connected.

Since the springs 40 and 36 are arranged in series, it is possible to change a compression length of the spring 40 as well as a compression length of the spring 36, which is the length in a compressed state, by adjusting the support position of the spring 36 using the spring force adjustment screw 37. That is, it is possible to adjust initial loads of the springs 36 and 40 applied to the pilot valve body 38. By adjusting the initial loads, it is possible to adjust the valve opening pressure of the pilot valve 6 against the electric current amount supplied to the solenoid Sol. For the adjustment of the initial loads, any configuration other than the spring force adjustment screw 37 may also be employed if it can adjust the support position of the spring 36 in the axial direction.

The second stator 31 of the solenoid Sol protrudes to the left side in FIG. 1 from the solenoid bobbin 29. A spacer 35 is fitted to the left-end outer circumference of the second stator 31. The spacer 35 has a tubular shape and has a flange 35a in the right-end inner circumference. The inner circumference of the flange 35a is fitted to the outer circumference of the second stator 31. The spacer 35 is also fitted to the inner circumference of the tube 18b provided in the outer tube 18. A gap between the spacer 35 and the tube 18b is sealed with a seal ring 41 mounted to the outer circumference of the spacer 35.

The failsafe valve 26 includes a failsafe valve body 42 slidably mounted to the outer circumference of the sliding contact portion 22d of the valve housing 22 and a spring 43 interposed between the failsafe valve body 42 and the flange 35a of the spacer 35.

The failsafe valve body 42 having a tubular shape includes a brim 42a provided in the outer circumference side, an annular protrusion 42b facing the right-end face of the flange 22b of the valve housing 22 in FIG. 1, an orifice passage 42c that causes the inner and outer circumferences of the failsafe valve body 42 to communicate with each other, and a communication hole 42d that is opened from the right end of FIG. 1 and communicates with the orifice passage 42c. A spring 43 is interposed between the brim 42a and the flange 35a of the spacer 35, so that the failsafe valve body 42 receives a thrust force exerted toward the flange 22b side of the valve housing 22 from the spring 43 at all times.

The right end of the failsafe valve body 42 faces the left end of the second stator 31, and a magnetic path is formed by the second stator 31, the failsafe valve body 42, the valve housing 22, the tube 18b, and the casing 25. As described above, as the coil 28 is magnetically excited, the failsafe valve body 42 is attracted to the second stator 31, so that a thrust force is exerted to the failsafe valve body 42 toward the right side of FIG. 1. If the electric current supplied to the solenoid Sol exceeds a predetermined value I1, the thrust force applied to the failsafe valve body 42 from the solenoid Sol exceeds the thrust force of the spring 43. As a result, the failsafe valve body 42 abuts on the second stator 31, and the pilot passage 4 is fully opened.

If the electric current supplied to the solenoid Sol is equal to or lower than the predetermined value I1, the thrust force applied to the failsafe valve body 42 from the solenoid Sol is weaker than the thrust force of the spring 43. As a result, the failsafe valve body 42 moves to a failure position where the annular protrusion 42b abuts on the flange 22b of the valve housing 22 so that the flow area of the pilot passage 4 is restricted. In the failure position, the orifice passage 42c of the failsafe valve body 42 faces the pilot passage 4, so that the pilot passage 4 communicates only via the orifice passage 42c. Therefore, the flow area of the pilot passage 4 is restricted by the flow area of the orifice passage 42c.

Therefore, if the electric current supplied to the solenoid Sol exceeds the predetermined value I1, the failsafe valve 26 moves to an open position where the pilot passage 4 is opened. If the electric current supplied to the solenoid Sol is equal to or lower than the predetermined value I1, the failsafe valve 26 moves to the failure position where the pilot passage 4 communicates only via the orifice passage 42c.

It is noted that the communication hole 42d is not blocked by the end portion of the second stator 31 and remains in the communication state even when the failsafe valve body 42 abuts on the second stator 31. In addition, even when the failsafe valve body 42 abuts on the second stator 31, the space where the rotor 33 is housed is not blocked. As a result, the pilot valve body 38 is not locked, and its movement is not prohibited.

Figure 3:
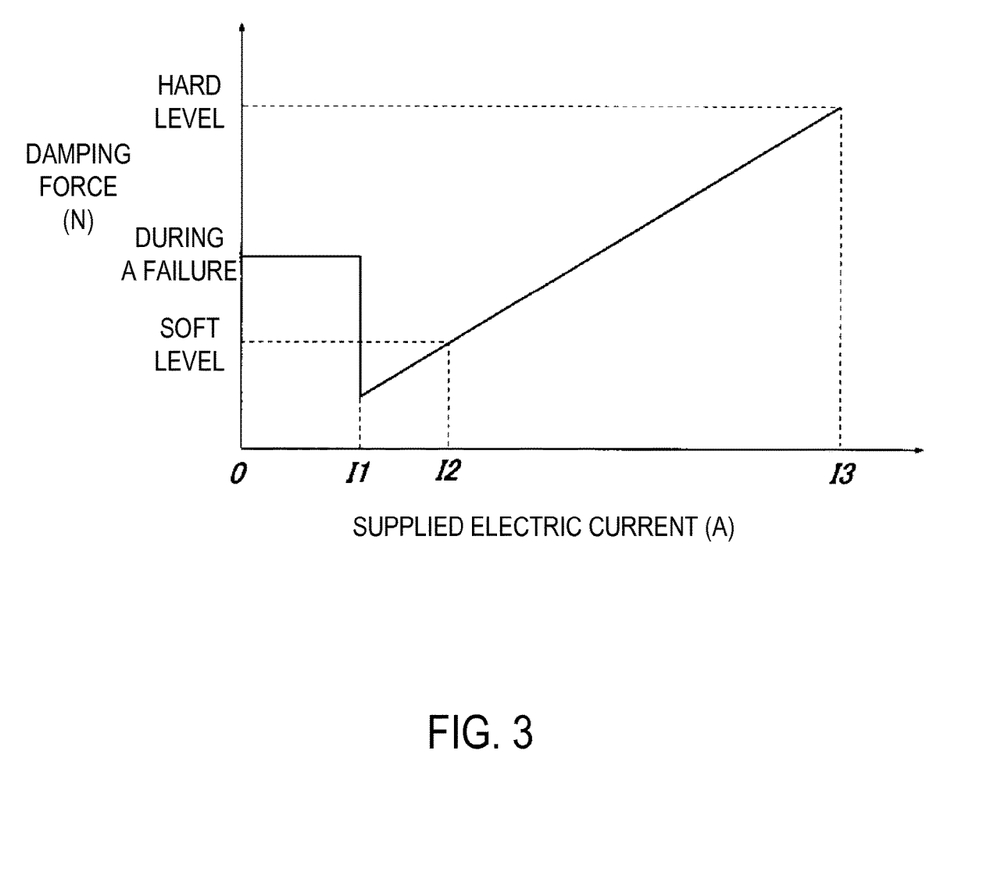
FIG. 3 is a diagram illustrating a relationship between the electric current supplied to the solenoid and the damping force of the shock absorber provided with the solenoid valve.

As illustrated in FIG. 3, during a normal operation in which the electric current can be supplied to the solenoid Sol, the electric current is supplied to the solenoid Sol ranging from the electric current value I2 higher than the predetermined value I1 to the electric current value I3. During a failure, the electric current supplied to the solenoid Sol stops. When the electric current ranging from the electric current value I2 to the electric current value I3 is supplied to the solenoid Sol, the pilot valve body 38 of the pilot valve 6 is pressed to the pilot valve seat 22a resisting to the biasing force of the spring 40 by virtue of the thrust force of the solenoid Sol and the biasing force of the spring 36.

When the pressure of the upstream side of the pilot passage 4 is applied to the pilot valve body 38, and a resultant force between the force of unseating the pilot valve body 38 from the pilot valve seat 22a and the biasing force of the spring 40 exceeds a resultant force between the thrust force of the solenoid Sol and the biasing force of the spring 36, the pilot valve 6 is opened, so that the pilot passage 4 is opened accordingly. That is, when the pressure of the upstream side of the pilot passage 4 reaches the valve opening pressure, the pilot valve 6 is opened, so that the pilot passage 4 is opened accordingly.

In this manner, when the electric current ranging from the electric current value I2 to the electric current value I3 higher than the predetermined value I1 is supplied to the solenoid Sol, it is possible to adjust the valve opening pressure of the pilot valve 6 by adjusting the thrust force of the solenoid Sol based on the amount of the electric current. As the pilot valve 6 is opened, the pressure of the pilot passage 4 upstream from the pilot valve 6 becomes equal to the valve opening pressure of the pilot valve 6. Therefore, the pressure of the back-pressure chamber P is also controlled by the valve opening pressure.

As described above, when the solenoid valve V1 is operated normally, the electric current ranging between the electric current values I2 and I3 higher than the predetermined value I1 is supplied to the solenoid Sol. As a result, the valve opening pressure of the pilot valve 6 is controlled, and the failsafe valve 26 causes the pilot passage 4 to remain in the opened state.

In comparison, during a failure in which supply of the electric current is naturally prohibited, the electric current is not supplied to the solenoid Sol even when the electric current can be supplied. In addition, the upper limitation I3 of the electric current value for a normal operation is defined by the specification of the solenoid Sol. The lower limitation of the electric current value for a normal operation is set to the electric current value I2 higher than the predetermined value I1 where the failsafe valve 26 switches to the failure position. Such a setting is to prevent the failsafe valve 26 from switching to the failure position when a normal operation is desired due to a change of the electric current supplied to the solenoid Sol or a shortage of the electric current caused by fluctuation of a power voltage or noise. Therefore, a margin is provided between the predetermined value I1 and the lower limitation I2 of the electric current value for a normal operation such that an erroneous operation can be prevented.

Next, a description will be made for operation of the solenoid valve V1.

When the solenoid valve V1 is normally operated, the electric current ranging from the electric current value I2 to the electric current value I3 is supplied to the solenoid Sol, so that the valve opening pressure of the pilot valve 6 is adjusted. As a result, a pressure of the pilot passage 4 between the orifice 5 and the pilot valve 6 is guided to the back-pressure chamber P via the second orifice 7.

In this manner, it is possible to adjust the internal pressure of the back-pressure chamber P and the pressure applied to the rear face of the leaf valve 3 by adjusting the valve opening pressure of the pilot valve 6. Therefore, it is possible to control the valve opening pressure for opening the main flow passage 1 of the leaf valve 3.

That is, the valve opening pressure in the main valve including the leaf valve 3 and the valve seat 2 is adjusted by the electric current amount supplied to the solenoid Sol. When the shock absorber D expands, the internal pressure of the rod-side chamber 13 can be controlled to the valve opening pressure of the main valve including the leaf valve 3 and the valve seat 2. When the shock absorber D contracts, the internal pressure of the cylinder 10 can be controlled to the valve opening pressure of the main valve including the leaf valve 3 and the valve seat 2.

When the electric current supplied to the solenoid Sol is set to the electric current value I2, the valve opening pressure of the pilot valve 6 is minimized, and the valve opening pressure of the main valve is also minimized. In this case, the shock absorber D generates a minimum soft damping force. On the contrary, when the electric current supplied to the solenoid Sol is set to the electric current value I3, the valve opening pressure of the pilot valve 6 is maximized, so that the valve opening pressure of the main valve is maximized. In this case, the shock absorber D generates a maximum hard damping force. As a result, it is possible to adjust the damping force of the shock absorber D steplessly from the soft level to the hard level by changing the electric current amount supplied to the solenoid Sol.

Since the solenoid valve V1 is provided with the second orifice 7 between the pilot valve 6 and the back-pressure chamber P, a delay is generated in the valve opening response of the pilot valve 6, so that, even when the internal pressure of the pilot passage 4 between the orifice 5 and the pilot valve 6 instantaneously becomes equal to or higher than the valve opening pressure, the second orifice 7 prevents such an instantaneous pressure rise from propagating to the back-pressure chamber P. Therefore, it is possible to suppress the influence on the valve opening pressure of the main valve including the leaf valve 3 and the valve seat 2 and stabilize the opening level of the main flow passage 1 of the leaf valve 3. As a result, it is possible to prevent an abrupt change of the damping force generated by the shock absorber D.

If the solenoid valve V1 is used in the shock absorber D in this manner, it is possible to suppress vibration or abnormal noise in a chassis. Therefore, it is possible to improve a vehicle ride quality without making passengers feel discomfort.

In addition, since the pilot passage 4 causes the rod-side chamber 13 and the reservoir 17 to communicate with each other only via the orifice 5 without the second orifice 7, resistance caused by the second orifice 7 is not added to the pressure loss generated by the main valve. Therefore, it is possible to suppress degradation of controllability of the damping force of the shock absorber D.

Furthermore, the right-end face of FIG. 1, which is the contact surface of the valve seat 2 where the leaf valve 3 is seated or unseated, is roughened. As a result, it is possible to prevent the leaf valve 3 from adhering to the valve seat 2 and make the leaf valve 3 easy to open. Therefore, even when a slight pressure change occurs in the back-pressure chamber P due to an opening delay of the pilot valve 6, it is possible to alleviate the delay of the valve open timing of the main valve and further alleviate an abrupt change of the damping force of the shock absorber D.

Moreover, using the solenoid valve V1, it is possible to control an internal pressure of the back-pressure chamber P and adjust the valve opening pressure of the main valve by applying the thrust force corresponding to the electric current supplied to the solenoid Sol to the pilot valve 6. As a result, it is possible to adjust the internal pressure of the back-pressure chamber P to a desired value without depending on the flow rate of the pilot passage 4. Even when the expanding or contracting rate of the shock absorber D is at a low rate area, it is possible to nearly linearly change the damping force against the electric current supplied to the solenoid Sol and improve controllability. In addition, since the internal pressure of the back-pressure chamber P applied to the rear face of the leaf valve 3 is controlled by applying the thrust force to the pilot valve 6 depending on the electric current supplied to the solenoid Sol, it is possible to reduce a deviation of the damping force.

Since no electric current flows to the solenoid Sol during a failure, the pilot valve 6 opens the pilot passage 4, and the failsafe valve 26 restricts the flow area of the pilot passage 4 to the flow area of the orifice passage 42c.

As the shock absorber D is operated to expand or contract in this state, the internal pressure of the back-pressure chamber P is defined by resistances of the orifice 5, the second orifice 7, and the orifice passage 42c. As a result, it is possible to set a characteristic of the internal pressure of the back-pressure chamber P against the expansion or contraction rate of the shock absorber D for a failure in advance and set the valve opening pressure of the main valve to an arbitrary value.

During a normal operation, as the damping force of the shock absorber D is adjusted by adjusting the valve opening pressure of the main valve, the failsafe valve 26 is in the open position, and only the pilot valve 6 is operated. Therefore, it is possible to independently adjust the valve opening pressure of the pilot valve 6 by excluding influence of the failsafe valve 26. In addition, during a failure, the flow area is restricted only by the failsafe valve 26 without restricting the pilot passage 4 using the pilot valve 6.

Therefore, there is no influence on the failsafe valve 26 even when the initial loads of the springs 36 and 40 applying the thrust force to the pilot valve body 38 of the pilot valve 6 is adjusted in order to correct a deviation between products caused by their allowances and the like. Therefore, since there is no influence on the damping force during a failure, it is possible to remove a deviation between products during both a failure and a normal operation.

Next, a description will be made for a second embodiment.

The solenoid valve V1 according to the first embodiment is provided with the second orifice 7 in the communication passage Pr that connects the back-pressure chamber P and the pilot passage 4. However, a solenoid valve V2 according to this embodiment is provided with a second orifice 50 between the orifice 5 and the pilot valve 6 in the pilot passage 4 as illustrated in FIG. 4.

Hereinafter, a description will be made for differences between the solenoid valve V2 according to this embodiment and the solenoid valve V1 according to the first embodiment. For the components having the same configurations as those of the solenoid valve V1 according to the first embodiment, like reference numerals denote like elements, and they will not be described in detail herein.

Figure 4:
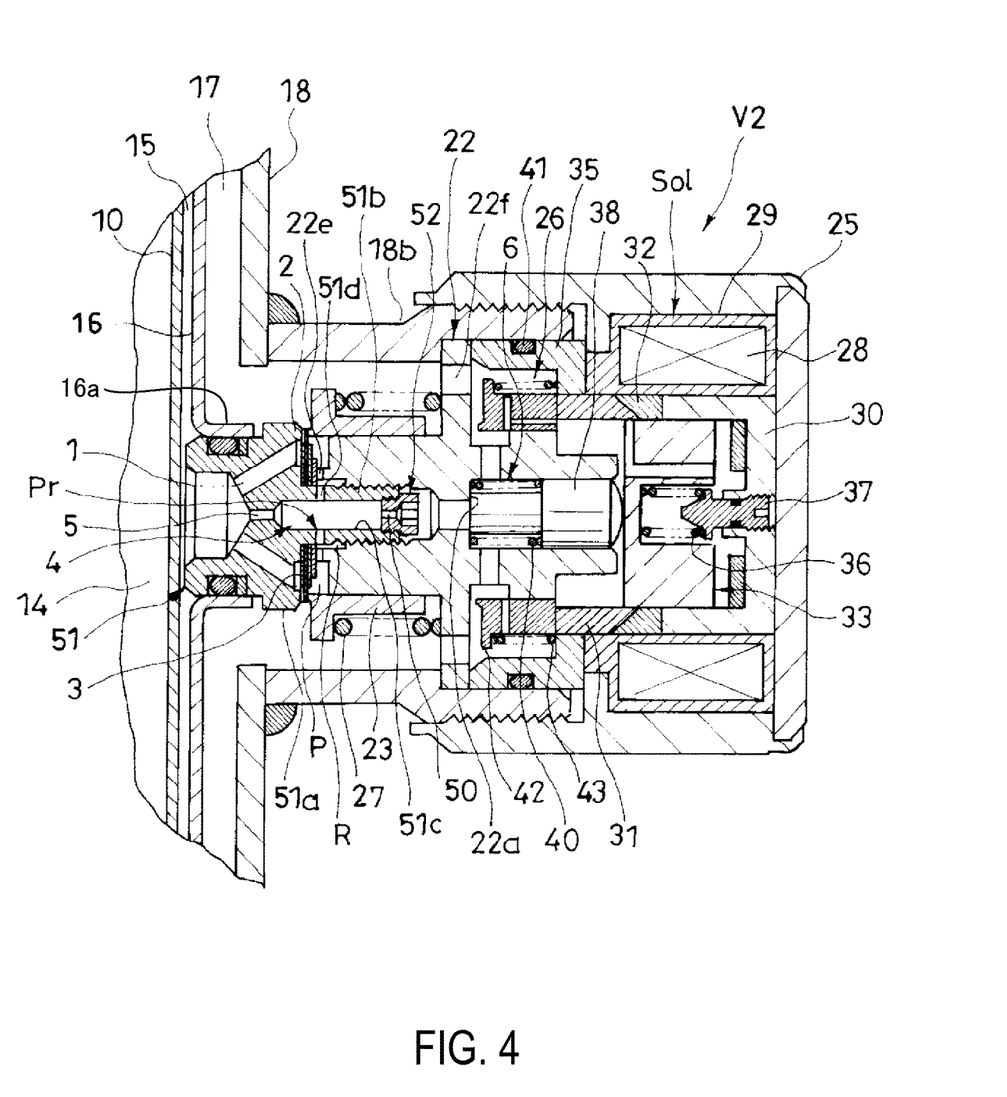
FIG. 4 is a cross-sectional view illustrating the solenoid valve according to a second embodiment of this invention.

Referring to FIG. 4, the seat member 51 of the solenoid valve V2 includes a basal portion 51a fitted to the sleeve 16a with a large diameter, a shaft portion 51b protruding to the right side of FIG. 4 from the basal portion 51a, a cavity 51c formed to penetrate through the basal portion 51a and the shaft portion 51b in an axial direction to form a part of the pilot passage 4, a penetrating hole 51d that is opened from the outer circumference of the shaft portion 51b and communicates with the cavity 51c, an orifice 5 provided in the discharge passage 15 side upstream from the connection point of the penetrating hole 51d in the cavity 51c, a main flow passage 1 including a plurality of ports penetrating through the basal portion 51a from the left end of FIG. 4 to the right end, and an annular valve seat 2 provided in the outer circumference side of the exit of the main flow passage 1 which is the right end of FIG. 5 of the basal portion 51a.

A plug 52 having the second orifice 50 is screwed to the right-end inner circumference of FIG. 4 of the shaft portion 51b of the seat member 51. The pressure between the orifice 5 and the second orifice 50 is guided to the back-pressure chamber P.

As seen from the pilot valve 6, the orifice 5 and the second orifice 50 are arranged in series between the pilot valve 6 and the rod-side chamber 13 in the upstream side. The internal pressure of the back-pressure chamber P is controlled by the valve opening pressure by adjusting the valve opening pressure of the pilot valve 6. However, even when the pressure between the pilot valve 6 and the second orifice 50 abruptly changes, this abrupt pressure change is suppressed from propagating to the back-pressure chamber P because the second orifice 50 is arranged between the back-pressure chamber P and the pilot valve 6.

In the solenoid valve V2, even when a valve opening response of the pilot valve 6 is delayed, and the internal pressure of the pilot passage 4 between the second orifice 50 and the pilot valve 6 rises over the valve opening pressure for an instant, it is possible to prevent the instantaneous pressure rise in the pilot passage 4 between the second orifice 50 and the pilot valve 6 from propagating to the back-pressure chamber P by virtue of the second orifice 50. As a result, the valve opening pressure of the main valve including the leaf valve 3 and the valve seat 2 is stabilized, and the opening level of the main flow passage 1 of the leaf valve 3 is stabilized accordingly. Therefore, it is possible to prevent an abrupt change of the damping force generated by the shock absorber D.

Since the orifice 5 and the second orifice 50 are arranged in series in the pilot passage 4 connected to the pilot valve 6, the flow rate passing through the pilot passage 4 is reduced. As a result, it is possible to reduce a pressure rise level in the pilot passage 4 between the second orifice 50 and the pilot valve 6 generated by an opening delay of the pilot valve 6. Accordingly, it is possible to further reduce influence on the valve opening pressure of the main valve.

If the shock absorber D is provided with the solenoid valve V2, it is possible to alleviate an abrupt change of the damping force of the shock absorber D. Therefore, it is possible to suppress vibration of a chassis or abnormal noise and improve a vehicle ride quality without making passengers feel discomfort.

Furthermore, in the solenoid valves V1 and V2, since the main valve body of the main valve is a thin leaf valve 3, it is possible to prevent the sizes of the solenoid valves V1 and V2 from increasing in the axial direction. It is noted that other types of valve bodies such as a spool or a poppet valve may be employed as the main valve body without limiting to the leaf valve if it can adjust the valve opening pressure with the internal pressure of the back-pressure chamber P applied to the rear face of the main valve body.

Furthermore, since the failsafe valve 26 has the orifice passage 42c that faces the pilot passage 4 to restrict the pilot passage 4 as it switches to the failure position, it is possible to simplify the structure of the solenoid valve V1 without necessity of arranging a subsidiary flow passage having a separate orifice in parallel in the pilot passage 4.

It is noted that, instead of the orifice passage 42c, a subsidiary flow passage having an orifice may be provided in parallel with the pilot passage 4 such that the pilot passage 4 is perfectly blocked by the failsafe valve 26, and only the subsidiary flow passage works in the event of a failure.

Other types of valves such as a choke valve may also be employed to restrict the flow area of the pilot passage 4 by the failsafe valve 26 instead of the orifice passage 42c.

The failsafe valve 26 may be omitted. In addition, other types of solenoids Sol can be employed without limiting to the configuration, the structure, and the magnetic path described above if it can drive the pilot valve 6.

Embodiments of the present invention were described above, but the above embodiments are merely examples of applications of the present invention, and the technical scope of the present invention is not limited to the specific constitutions of the above embodiments.

This application claims priority based on Japanese Patent Application No. 2013-027393 filed with the Japan Patent Office on Feb. 15, 2013, the entire contents of which are incorporated into this specification.

The invention claimed is:

1. A solenoid valve comprising:
a valve seat provided in a main flow passage;
a main valve body seated on or unseated from the valve seat to open or close the main flow passage, the main valve body being biased to an opening direction by virtue of a pressure from the main flow passage upstream of the valve seat;
a pilot passage that branches from the main flow passage;
an orifice provided in the pilot passage;
a communication passage that branches off from the pilot passage at a position downstream from the orifice;
a back-pressure chamber connected to the pilot passage via the communication passage, the back-pressure chamber being configured to bias the main valve body to a closing direction by virtue of an internal pressure;
a pilot valve disposed in the pilot passage downstream from the communication passage, the pilot valve being configured to control an internal pressure of the back-pressure chamber;
a solenoid configured to control a valve opening pressure of the pilot valve; and
a second orifice provided in the pilot passage and between the communication passage and the pilot valve, the second orifice being so configured as to prevent an instantaneous pressure rise in the pilot passage, generated due to a delay in an opening response of the pilot valve, from inducing an instantaneous pressure rise in the back-pressure chamber, wherein the internal pressure of the back-pressure chamber is controlled according to a valve opening pressure of the pilot valve the pilot passage is formed to be branched from the main flow passage on an upstream side of the valve seat, the communication passage is provided upstream of the second orifice, and the pilot valve includes a pilot valve seat that has an opening formed thereon, a diameter of the opening being larger than that of the second orifice.

2. The solenoid valve according to claim 1, wherein a contact surface of the valve seat where the main valve body is seated is roughened.

3. The solenoid valve according to claim 1, further comprising:

a main spool having a tubular shape, the main spool abutting on a rear face of the main valve body, the main spool being configured to define the back-pressure chamber in a rear face side of the main valve body; and a biasing mechanism that biases the main spool toward the main valve body, wherein the main valve body is an annular leaf valve.

4. The solenoid valve according to claim 1, further comprising a shaft portion in which the pilot passage is formed, wherein the orifice and the second orifice are coaxial to the shaft portion.

* * * * *